(No Model.)  4 Sheets—Sheet 1.

F. W. WRIGHT.
HOSE COUPLING.

No. 474,894. Patented May 17, 1892.

WITNESSES:
John Becker
Fred White

INVENTOR:
Frederic W. Wright,
By his Attorneys,
Arthur C. Fraser & Co.

THE NORRIS PETERS CO., PHOTO-LITHO., WASHINGTON, D. C.

(No Model.) 4 Sheets—Sheet 2.

F. W. WRIGHT.
HOSE COUPLING.

No. 474,894. Patented May 17, 1892.

WITNESSES:
John Becker
Fred White

INVENTOR:
Frederic W. Wright,
By his Attorneys,
Arthur C. Fraser & Co.

(No Model.)　　　　　　　　　　　　　　　　　　　4 Sheets—Sheet 3.
F. W. WRIGHT.
HOSE COUPLING.

No. 474,894.　　　　　　　　　　　Patented May 17, 1892.

WITNESSES:
John Becker
Fred White

INVENTOR:
Frederic W. Wright,
By his Attorneys,
Arthur E. Fraser & Co.

(No Model.)  F. W. WRIGHT.  4 Sheets—Sheet 4.
HOSE COUPLING.

No. 474,894.  Patented May 17, 1892.

WITNESSES:
John Becker
Fred White

INVENTOR:
Frederic W. Wright,
By his Attorneys,
Arthur C. Fraser

UNITED STATES PATENT OFFICE.

FREDERIC W. WRIGHT, OF GREAT NECK, NEW YORK.

HOSE-COUPLING.

SPECIFICATION forming part of Letters Patent No. 474,894, dated May 17, 1892.

Application filed June 15, 1891. Serial No. 396,390. (No model.)

*To all whom it may concern:*

Be it known that I, FREDERIC W. WRIGHT, a citizen of the United States, residing in Great Neck, in the county of Queens and State of New York, have invented certain new and useful Improvements in Hose-Couplings, (Case D,) of which the following is a specification.

This invention relates to couplings for joining together the ends of flexible pipes or hose, being especially adapted and designed for coupling the ends of steam-heating or air or fluid pressure brake-pipes used on railway-cars.

The improved coupling provided by this invention is of the general class of direct-port couplings—that is to say, those in which the seating-faces of the couplings meet in a plane substantially perpendicular to the general direction of the hose or pipe at the point of junction, so that the passage through is direct instead of being deflected laterally.

My invention also relates to couplings of that class wherein the two coupling-heads are locked together by the union of wedging-surfaces which are engaged by an angular movement of the heads relatively to one another as the coupling is dropped to the pendent position which the flexible hose assumes when coupled. It is consequently of that class wherein the coupling is locked by gravity.

It also relates to those couplings which are constructed to be uncoupled automatically by the pulling apart of the cars.

My invention introduces certain improvements in hose-couplings of the character above set forth, designed to perfect the operation and facilitate the construction of such couplings.

Figure 1:
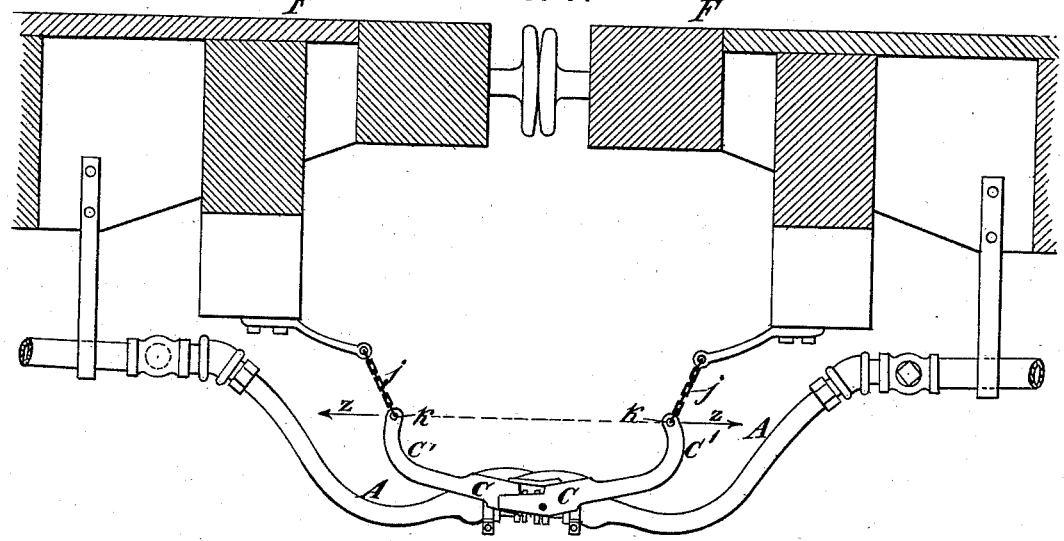
Figure 2:
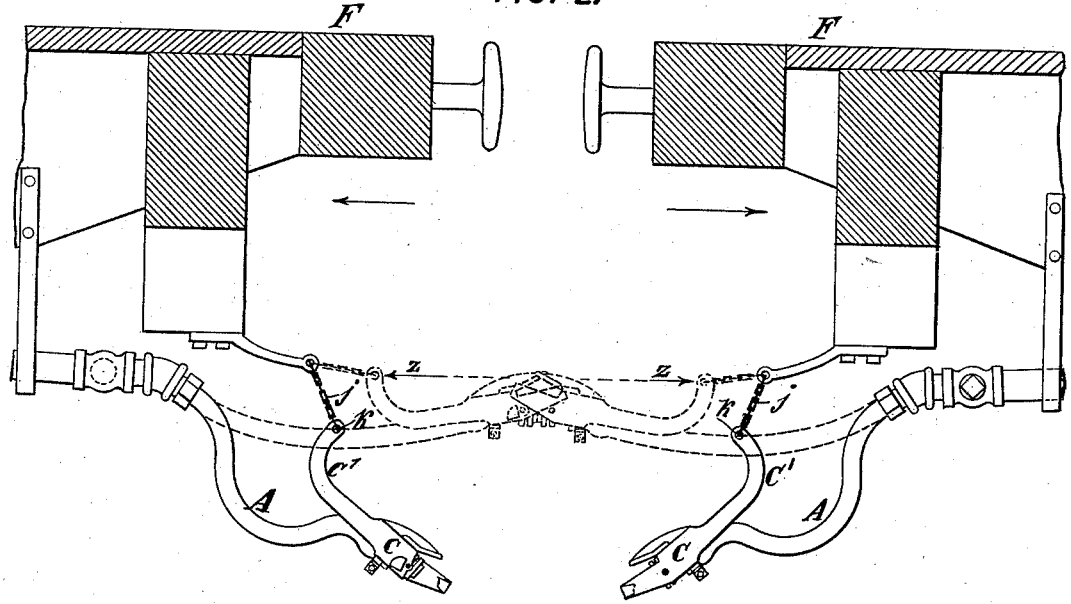
Figure 3:
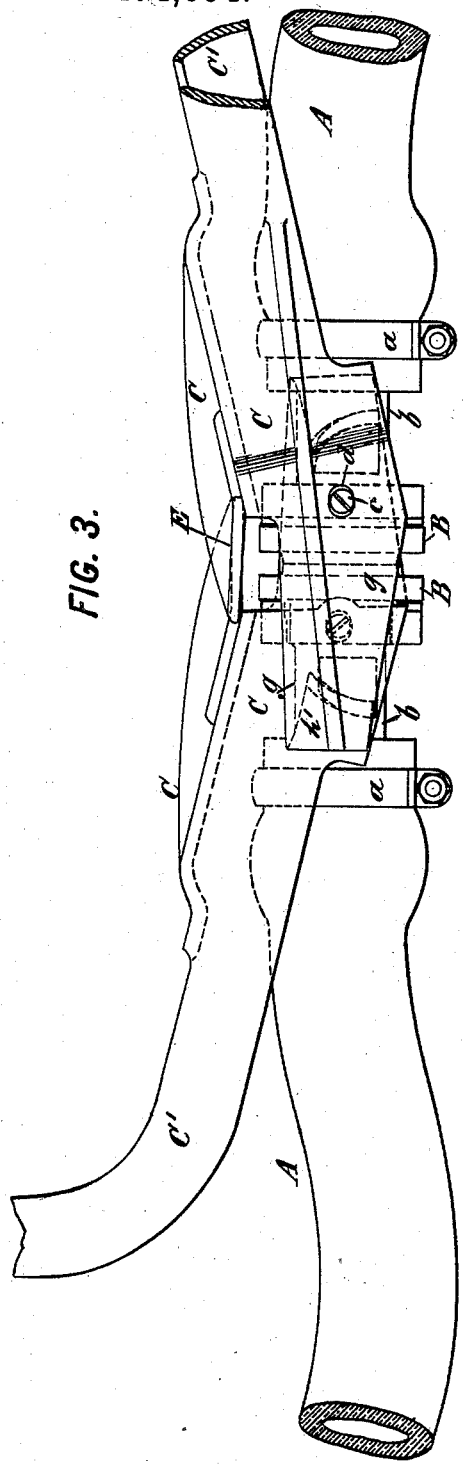
Figure 4:
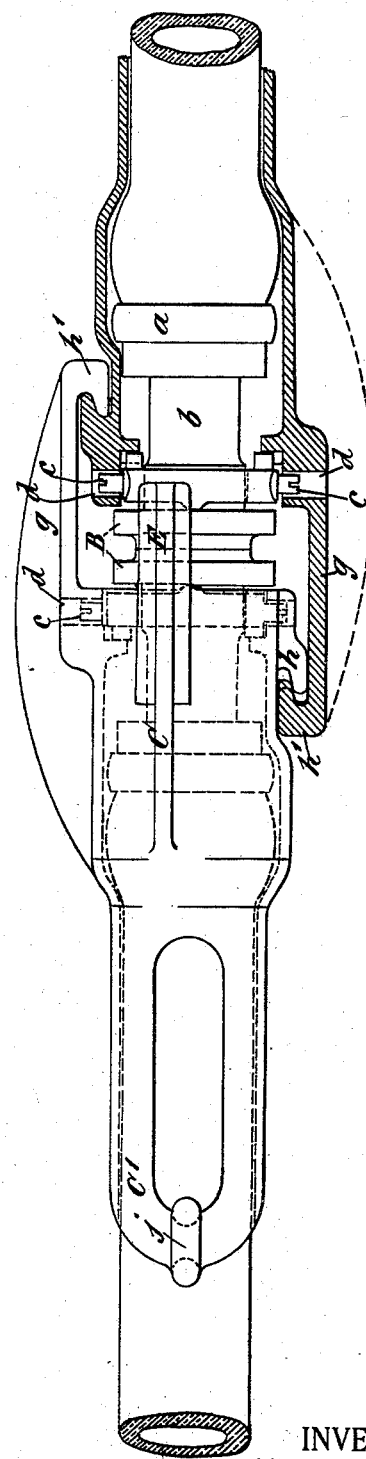
Figure 5:
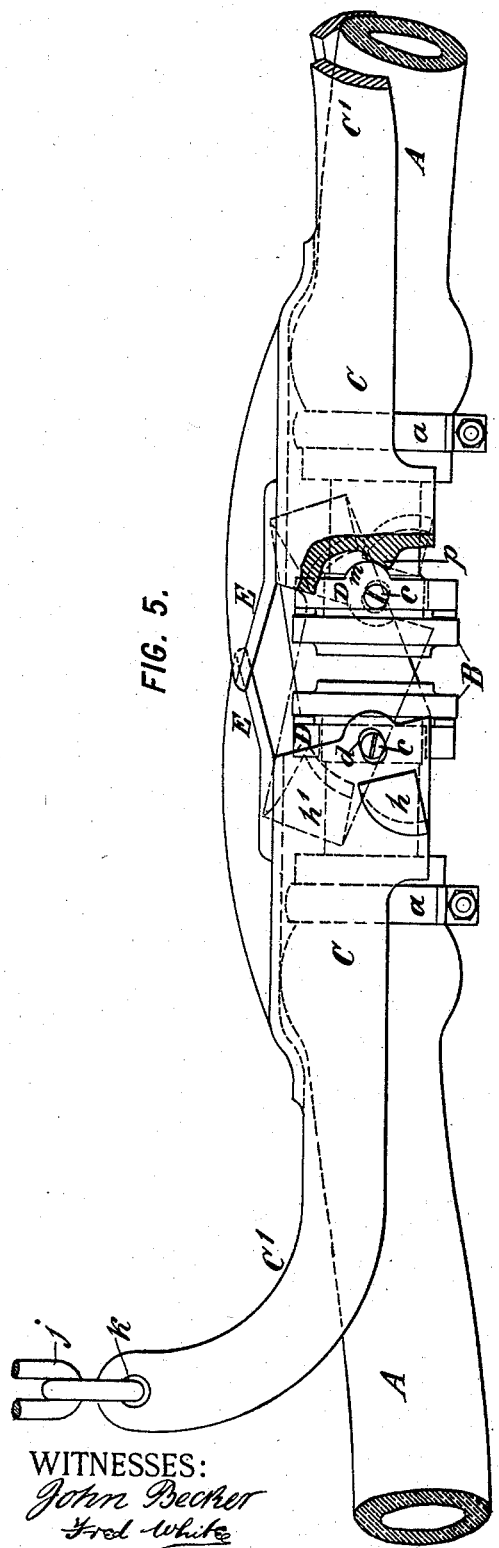
Figure 6:
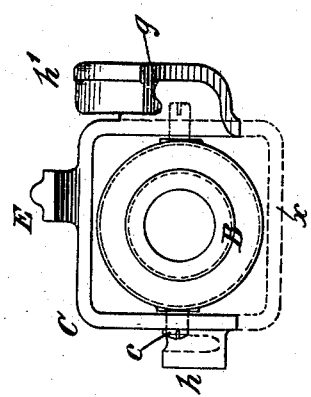
Figure 11:
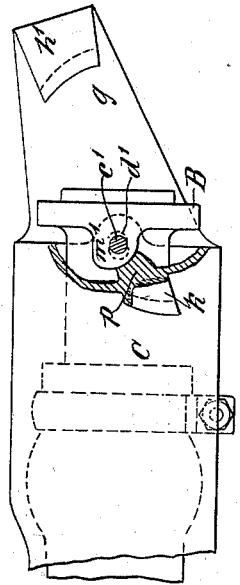
Figure 9:
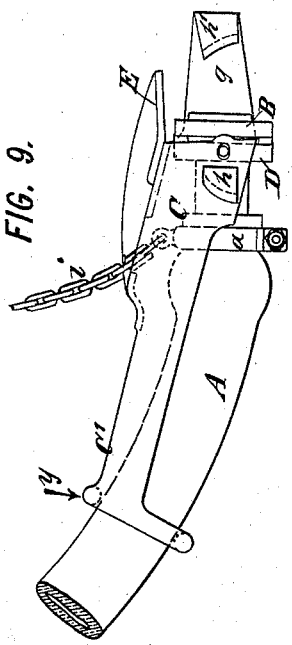
Figure 10:
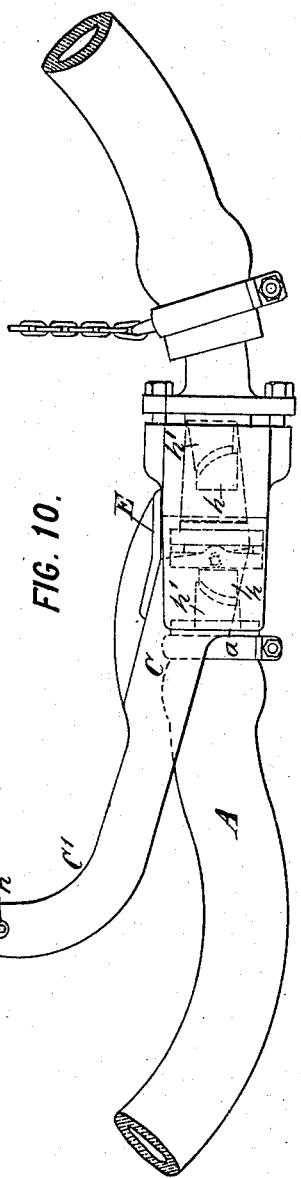
Figure 7:
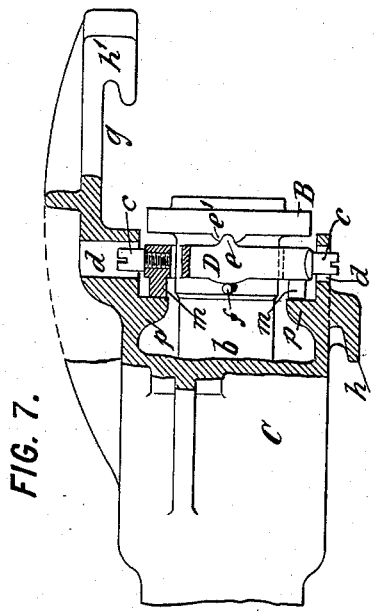
Figure 8:
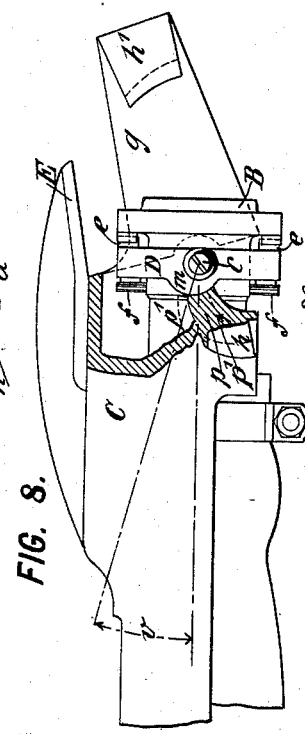

Referring to the accompanying drawings, Figure 1 is a side elevation of the hose-sections of two railway-cars coupled together by means of the improved coupling provided by my invention. Fig. 2 is an elevation showing one coupling and its connected hose in the uncoupled position. Fig. 3 is a side elevation, on a larger scale, showing the two couplings connected. Fig. 4 is a plan thereof, one of the couplings being partly in horizontal section. Fig. 5 is a side elevation, partly broken away, and showing the couplings in the act of being coupled or uncoupled. Fig. 6 is an end elevation of one of the couplings. Fig. 7 is a plan thereof, partly broken away, in horizontal mid-section. Fig. 8 is a side elevation of one of the couplings, partly broken away, in vertical section, cut in two different planes to show the internal construction. Fig. 9 is a side elevation of a modified construction. Fig. 10 is a side elevation showing my improved coupler intercoupled with a so-called "Sewall coupler." Fig. 11 is a side elevation showing a modified construction of my improved coupler, partly in section.

Referring to the drawings, let A designate the respective lengths or sections of flexible pipe or hose to be coupled together, B B the seats applied to the ends thereof, and C C the respective coupling sections or heads. The seats B B consist of rings of suitable material, the abutting faces of which are preferably made perfectly true and flat, so that when pressed together they will make a tight joint. The seats are attached to the hose in any suitable way, of which several are known in the art. The construction shown consists of a tubular shank or thimble *b*, attached to or formed integrally with the seat and projecting rearwardly therefrom, and over the rear end of which is drawn the rear end of the hose, which is fastened by a band *a*, clamped around it in a manner well known.

A distributing-ring D is applied around the shank *b*, back of the seat B, and constitutes a means through which the coupling section or head is connected to the seat. This ring is pivotally connected to the seat at diametrically-opposite sides, the pivots thus formed being on a vertical axis and is pivotally connected to the coupling head or section C by pivotal projections at diametrically-opposite sides, the pivots thus formed being on a horizontal axis. The ring is thus given a universal motion, so that it may accommodate itself to varying positions of the coupling-head and seat relatively to one another. Its principal purpose is to transmit the pressure from the head to the seat when the two heads C C are coupled together and distribute this pressure uniformly over the entire area of the two seats, so that they shall be forced firmly together face to face. In the construction shown, which is one of many that may be employed, the equalizing-ring is formed or provided at its sides with pivotal pins *c c*, which enter notches d d in the coupling section or head C, whereby the ring is pivoted to this section, and with pivotal lugs or projections e e on its front face at top and bottom entering notches e' in the rear face of the seat B, as shown best in Fig. 7, whereby it is pivotally connected to the seat. To prevent any retrograde movement of the ring away from the seat, whereby its lugs might be disengaged from the notches, pins f are inserted into the shank b against the rear face of the ring, as shown in Fig. 7, it being preferable to form the ring with an arc-shaped rear face f', at this point made concentric with the pivotal center of the lug e and notch e'. By this means the parts are so connected as to permit of the universal motion referred to, while holding them together in a sufficiently intimate manner to prevent their relative displacement.

Each of the coupling sections or heads is formed on one side with a locking-arm g and on the other side with a locking projection h. The locking-arm projects forward considerably beyond the seating-face and is formed on its end with a hook-like projection h', formed with a cam-face on the inner side and adapted to engage the projection h on the opposite coupling-head in the manner shown in Fig. 4. The engaging faces of the projections h and h' are made eccentric in such manner that when the two coupling-heads are engaged together by means of these projections and are moved inwardly relatively to one another, so as to bring the respective projections into coincidence, their cam-faces will interlock after the manner of a wedge and thereby draw the two coupling-heads toward one another. This method of uniting the two heads of a coupling is already known in the art, being that employed in the Sewall coupler now so largely introduced upon railways for coupling together the steam-heating pipes.

My improved coupler is designed to intercouple with the Sewall coupler, for which purpose I employ these eccentric-locking projections and arrange them in the same relative positions. Fig. 10 shows my improved coupler coupled with the said Sewall coupler.

In my new coupler the locking-arms g, instead of projecting in line with the coupling-sections C C, as heretofore, are tilted upwardly relatively thereto in the manner best shown in Fig. 5. The object of this construction is to facilitate the coupling operation and insure the meeting of the seating-faces flatly together and to avoid any rocking of the faces upon one another, which is liable to wear them at one side and cause leakage. In the Sewall coupler, for example, the two coupling-heads are brought together at an upward angle in coupling, the lower edges of the seats being first attached, and by the locking motion the two heads are rocked upon each other until, when finally locked together, they are brought into line, and during this operation the seats rock one upon the other. By my improved construction the coupling-heads are brought together in line end to end, as shown in Fig. 5, and the seats are consequently brought together face to face without any rocking movement. After the seats are thus brought together the coupling-heads are tilted or rocked downward, so that by the angular movement thus given their locking projections are caused to engage and are wedged tightly together. This movement brings the heads into an inclined position, as shown in Fig. 3. By the wedging action of the locking-faces forcing the two heads toward one another the seats are forced tightly together through the interposition of the distributing-rings, which by their tilting movement allow for the obliquity of the coupling-heads relatively to the axial line of the passage or port through the seats.

In order to facilitate the union of the two coupling-heads and to insure that the seats are brought together in exact coincidence in vertical direction, (their coincidence in lateral direction being insured by the engagement of the locking projections,) I prefer to provide each head with a guiding arm or finger E, projecting from its top forwardly beyond the plane of the seating-face and into position to bear upon the top of the other coupling-head, as shown in Fig. 3. I make no claim to these guiding arms or fingers in this application, as they are made the subject of another application for patent which I have prepared, Serial No. 395,642, filed June 5, 1891.

The coupling-heads C C are preferably constructed each as a partial shell or channel partly inclosing the end portion of the hose A, and also the fastening device a b, by which the hose is connected to the seat. This construction is clearly shown in Fig. 6. The front portion of the head, adjacent to the fastening devices, might be strengthened by extending it entirely around the end portion of the hose, or, more correctly, around the shank b, as shown by dotted lines at x in Fig. 6; but this is not deemed necessary. From the front portion of the head the latter is extended backwardly to constitute the long arm of a lever, as shown at C', this backward extension being preferably made of half-round form and adapted to fit over the upper portion of the hose in the manner shown in Fig. 5. The outer portion or end of the lever-arm might be constructed in a ring to extend around and bear upon the hose, as shown in Fig. 9, and as shown, also, in my previous patent No. 449,789, dated April 7, 1891. With such a construction the weight of the coupling-heads and their attached parts or the greater portion of such weight would be borne by the two hose resting upon each at the point y in Fig. 9. In such case it would be necessary to provide the end portion of the hose with a supporting-chain i, as shown in Fig. 9, in order to support the coupling-head when uncoupled and prevent its hanging too low from the end of the car. This chain is ordinarily attached to an eye formed at the upper side of the band a.

My present invention provides an important improvement upon this construction, which is shown most clearly in Figs. 1 and 2. Each coupling-head is formed with a lever arm or tail C', extending back a sufficient distance to give the requisite leverage and there formed with an eye k or other means for attaching it to one end of a chain j or other suitable suspending device—such as a strip or articulated bar—the other end of which is attached to the platform F of the car. The entire weight of the couplings, and also a considerable portion of the weight of the hose, is thus hung suspended from these two chains. By this means the lengths of hose are relieved of the strain of carrying the couplings and also of about half the strain of carrying their own weight. The couplings are also suspended at a higher point, so that the steam-passage does not droop as low as heretofore, so that there is less liability of forming a trap, in which water of condensation will accumulate; but the most important advantage of this construction is that the couplings, in common with all couplings of this class called "gravity couplings," are retained coupled by their own weight and suspended from unyielding points of support instead of being supported upon or by the lengths of hose, and the weight tending to hold the couplings locked together is increased to the extent of the portion of the weight of the hose-lengths which is removed from their attached ends (which heretofore have carried the entire weight) and is borne by the couplings. There is thus with the same weight of the parts themselves a greater gravitating effect, tending to retain the couplings locked together, so that the liability of their accidental uncoupling and their tendency to leakage are reduced. The couplings may be carried at a higher or lower level by making the chain j longer or shorter, it being only essential that these chains shall be sufficiently long to allow the necessary freedom of motion to accommodate for the movements of the end portions of the platforms or cars relatively to one another.

My improved coupling is designed in common with others of its class to uncouple automatically upon the pulling apart of the cars. This automatic uncoupling may be performed in either of two ways, depending upon the proportions of the respective parts. If the chains j are made relatively long and the hose-lengths A A relatively short, then upon the moving apart of the cars the hose-lengths will straighten out, and by so doing will lift the entire coupling, thereby slackening the chains j and permitting the arms C' to drop, so as to bring the two coupling-heads into line with one another, and thereby to move the locking projections h h' out of the positions shown in Fig. 5. The better plan, however, is to make the chains j relatively short and the hose-lengths A A relatively long, so that as the cars pull apart the chains will pull taut before the hose-lengths, and will thereby exert a strain in the direction of the arrows z z in Fig. 1 which will tend to draw the two coupling-sections into line, and by so doing will in the same positive manner tilt them and disengage their locking projections. This latter construction is the one shown in Fig. 1 and is preferred because it relieves the hose of all strain and because it effects the uncoupling in the most positive manner possible and without relying upon the weight of the parts to effect their angular movement. The automatic uncoupling is insured by constructing the lever-arms C' each with its eye k where it is attached to the chain j at a sufficient height above the plane of the coupling-faces. This height should be such that when a pressure is exerted against these eyes in opposite directions, as shown by the arrows z, and the coupling-sections are consequently straightened out or brought into line thereby their locking-faces will be disengaged and clear one another before these faces shall have been drawn upward to the level of a straight line extending between the respective eyes—that is to say, before the engaging portions of the locking-faces are intersected by the line of strain.

I would remark that in common with all other automatically-uncoupling hose-couplers my improved coupler should not habitually be uncoupled automatically, the provision for automatic uncoupling being designed only in case a train-hand should forget or omit to manually uncouple the couplers before the cars are drawn apart. The means for automatic uncoupling provided by my invention is, however, I believe, more positive and effective in its action than those of other gravity-couplers heretofore used.

When a coupling is uncoupled, the chain j serves the purpose of suspending it, and prevents its hanging too low, so that it thus takes the place of the chain i, Fig. 9, heretofore commonly used with hose-couplings. The hose is shown uncoupled and the coupling hanging from this chain in Fig. 2. The lever-arm C' and chain j should be made of a total length sufficiently short to hold the coupling suspended at the requisite height, so that it shall not hang too low or too close to the track.

My invention provides a further means for effecting the wedging or locking together of the two coupling-heads, this being best shown in Figs. 7 and 8. It will be understood by the foregoing description that during the locking movement of the coupling-head C it moves angularly relatively to the distributing-ring D. This angular movement I utilize for the purpose of exerting a further wedge-like thrust by each coupling-head against its distributing-ring and consequently against its seat to force the latter into firmer and closer union with the reciprocal seat. To this end the distributing-ring D is formed on opposite sides with eccentric or wedging cam-faces *m m*, formed, preferably, as rearward projections from the ring back of its pivots *c*, as shown in Fig. 8. The coupling-head C is formed interiorly with projections *p p* on opposite sides, which are arranged to come against the cam-faces, as shown best in Fig. 7. When the coupling-heads are brought together in line with one another, as shown in Fig. 5, the projections *p* on the head come against the cam-faces *m* in the position shown in Fig. 8. When the angular or rocking movement of the head, however, is about to the extent indicated by the arc *v* in Fig. 8, the projections *p* slide up against the cam-faces *m* to about the position shown in dotted lines at *p'* in Fig. 8, and thereby bear against the portion of the eccentric cam-face which is farther removed from the pivotal pins *c*, thereby causing the distributing-ring to move forward relatively to the coupling-head, the slots *d* being sufficiently elongated to provide for this movement. By means of this forward movement a cam-like thrust is exerted to force the seat B forward relatively to the coupling-head, thereby crowding the two seats into very close and intimate contact.

My patent of April 7, 1891, before referred to, shows the coupling-heads connected to the seats through the medium of distributing-rings in such manner as to be movable the one relatively to the other, so that the seats may come together face to face and be consequently forced together by the angular locking movement of the coupling heads or sections. It also shows a locking-arm on one head having a locking projection engaging a projection on the side of the opposite head. These features are consequently not claimed by me in my present specification.

The distributing-rings D D are not essential to my present invention, although highly advantageous for the reasons hereinbefore given, and may be omitted, if desired, without departing from the principal features of my invention. If the ring is omitted, the coupling head or section C will engage directly with the seat B, which should be done in the manner shown in Fig. 11, where the seat is provided with pivots, one of which is shown in section at *c'*, passing through slots in the head, one of which is shown in dotted lines at *d'*, and may be formed with cam-faces *m'*, engaging the projections *p*, formed in the head C, one of which projections is shown in section.

I claim as my invention the following-defined novel features or improvements substantially as hereinbefore specified, namely:

1. In a hose-coupling for railway-cars, the combination, with the respective car-bodies and hose-lengths, of coupling-heads formed with reciprocally-engaging wedging projections adapted to lock together by gravity, having each a rearwardly-extended lever arm or tail, and means independent of the hose for suspending these tails from the respective car-bodies at such height relatively to the lengths of the hose-sections that the entire weight of the couplings shall be suspended from the car-bodies and the hose-lengths relieved of strain, substantially in the manner specified.

2. In a hose-coupling for railway-cars, the combination, with the respective car-bodies and hose-lengths, of coupling-heads having reciprocally-engaging locking projections and formed each with a rearwardly-extended lever arm or tail, and a suspending device for suspending each such tail from the respective car-body, these suspending devices being of such length relatively to the length of the hose-sections that as the cars are moved apart they will be drawn into line and exert an endwise pull against the tails of the coupling-heads before both sections are pulled taut, whereby the coupling-heads will be drawn apart and automatically uncoupled without subjecting the hose to strain, in substantially the manner specified.

3. In a hose-coupling for railway-cars, the combination, with the respective car-bodies and hose-lengths, of coupling-heads formed with reciprocally-engaging locking projections and having each a rearwardly-projecting lever arm or tail, and means for suspending these tails from the respective car-bodies, said lever-arms being turned upwardly at their point of attachment to said suspending means relatively to the plane of engagement of the locking projections in such manner that as the cars are moved apart the pull exerted through the suspending means upon the tails of the respective coupling-heads will act to pull the heads angularly relatively to one another in direction to disengage said locking projections, and such disengagement will be effected before the horizontal plane of the engaging faces of the locking projections is lifted into coincidence with the line of strain.

4. In a hose-coupling for railway-cars, the combination, with the car body and hose, of a seat fastened to the end of the hose, a coupling-head engaging said seat, movable angularly relatively thereto, formed with locking projections adapted to engage a reciprocal coupling-head and having a rearwardly-extended lever arm or tail independent of the hose, and a chain for suspending this tail from the car-body at such height as to sustain the weight of the coupling and relieve the hose from strain, to the effect substantially as specified.

5. In a hose-coupling, the combination, with the hose, of a seat fastened to the end thereof, a coupling-head connected to said seat so as to be movable angularly relatively thereto, and formed with locking-faces adapted to engage similar faces on a reciprocal coupling-head, and wedging or eccentric surfaces interposed between said seat and head and adapted by the angular movement of the head in the act of coupling to force the seat forwardly relatively to the head.

6. In a hose-coupling, the combination, with the hose, of a seat fastened to the end thereof, a coupling-head connected to said seat so as to be movable angularly relatively thereto, and formed with locking-faces adapted to engage similar faces on a reciprocal coupling-head, eccentric surfaces $m\ m$ in connection with said seat, and bearing projections $p\ p$, formed on said head and acting against said eccentric surfaces, whereby by the angular movement of the head in the act of coupling the seat is forced forwardly relatively to the coupling-head by the engagement of said projections against said eccentric surfaces.

7. In a hose-coupling, the combination, with the hose, of a seat B, fastened to the end thereof, a distributing-ring D, engaging said seat, and a coupling-head C, pivotally connected to said ring, with eccentric wedging-surfaces $m$ and bearing projections $p$, formed on the ring and head, respectively, and adapted by the angular movement of the head to thrust the ring and thereby, also, the seat forwardly relatively to the head.

8. In a hose-coupling, the combination of the hose, a seat B, fastened to the end thereof, an equalizing-ring D behind said seat and pivotally connected thereto at diametrically-opposite points by means of pivotal lugs formed on the one part entering notches in the other, projections $f$ for retaining said lugs and notches in pivotal engagement, and a coupling-head C, pivotally connected to said ring on an axis at right angles to the axis of the pivotal connection between said ring and seat by means of pins on the one part entering sockets in the other.

In witness whereof I have hereunto signed my name in the presence of two subscribing witnesses.

FREDERIC W. WRIGHT.

Witnesses:
GEORGE H. FRASER,
CHARLES K. FRASER.